United States Patent [19]

Gronau et al.

[11] Patent Number: 5,542,158
[45] Date of Patent: Aug. 6, 1996

[54] GROMMET FASTENER ASSEMBLY FOR AUTOMOBILES

[75] Inventors: Randall J. Gronau, Mt. Clemens; Robert Osterland, East China, both of Mich.

[73] Assignee: Emhart Inc., Newark, Del.

[21] Appl. No.: 304,447

[22] Filed: Sep. 12, 1994

[51] Int. Cl.⁶ .................................................. A44B 17/00
[52] U.S. Cl. ................................. 24/295; 24/289; 24/297
[58] Field of Search ............................ 24/295, 297, 292, 24/293, 289; 411/508, 510, 913

[56] References Cited

U.S. PATENT DOCUMENTS

| | | | |
|---|---|---|---|
| 2,471,247 | 5/1949 | Stadler | 24/295 |
| 2,946,612 | 7/1960 | Ahlgren | 411/913 |
| 4,250,599 | 2/1981 | Nagashima et al. | 24/289 |
| 4,402,118 | 9/1983 | Benedetti | 24/293 |
| 4,778,320 | 10/1988 | Nakama | 24/297 |
| 4,865,505 | 9/1989 | Okada | 24/293 |
| 5,193,961 | 3/1993 | Hoyle et al. | 24/297 |

FOREIGN PATENT DOCUMENTS

| | | | |
|---|---|---|---|
| 0254071 | 1/1963 | Australia | 24/289 |
| 0149312 | 2/1982 | Japan | 24/297 |
| 0884123 | 12/1961 | United Kingdom | 24/297 |

*Primary Examiner*—Victor N. Sakran
*Attorney, Agent, or Firm*—Edward D. Murphy

[57] ABSTRACT

A fastener grommet assembly of soft or flexible plastic material which forms a non-porous "bathtub" enclosure that fits into an aperture in the body panel part of the automobile. A depending lug from an interior part of the automobile is provided with a metal retainer member that forms a pliable prong that can be pushed into a snap-fit relationship with the flexible grommet member and thus cause opposing wall portions of the grommet to expand into a seal-tight engagement with the rim of the aperture of the exterior body panel part of the automobile.

6 Claims, 1 Drawing Sheet grommet fastener assembly for automobiles

BACKGROUND OF THE INVENTION

The present invention relates to a fastener assembly for fastening a vehicular interior part, that is, upholstery or trim material, to selected areas of a body panel part in vehicles such as automobiles or boats.

Presently, such fasteners usually employ two or three elements for joining or fastening a depending member of the interior part (trim or upholstery) to an aperture in the body panel member of the automobile. For this purpose a grommet or retainer member generally in the form of an oblong receptacle is designed to receive a spring clip member, which assembly is inserted into the aperture of a body panel in a snap-fit like manner. A depending member of the interior part is then inserted into the clip member within the grommet assembly and is retained thereby. Alternatively, the clip member, the depending portion of the interior part and the grommet assembly can be united and then inserted as a single unit into the oblong hole in the body panel member in a snap-fit manner.

Such conventional fastener arrangements as above described perform as one-way fasteners; that is, once they are installed they are not intended to be removed without incurring damage to the depending prong member of the interior part that is fastened to the grommet assembly, since the metal retaining clip is designed to cut or gouge the softer plastic material of the prong member for maximum holding or pull-down power. Consequently it is difficult to remove such fasteners when it is desirable to service or replace interior parts of the automobile. Also, the aforementioned grommet serves merely as a gripping receptacle for the clip and prong part of the assembly and for this purpose is provided with pliant leg members cut out of the side walls thereof for facilitating a snap-fit with the oblong hole in the body panel member to which it is fitted. Because the grommet is defined by slots and apertures, owing to the cut out portions, the grommet is free to pass moisture and fluid from the exterior of the body panel to the interior of the fastener assembly, thus hastening the progress of rust and corrosion between the metal parts of the clip member, as well as allowing leakage of fluid into the interior of the automobile.

OBJECTS AND SUMMARY OF THE INVENTION

It is the primary purpose and principle object of the present invention to address the aforementioned deficiencies of conventional fastener assemblies used in automobiles and to provide, therefore, a novel fastener assembly which can be removed without damaging the fastener parts or the interior parts of the automobile when servicing or repair is required.

It is another object of the present invention to provide a fastener assembly, particularly a retainer and grommet assembly for fastening interior parts of automobiles to a body panel member which is leak-proof and thus prevents moisture, fluid or dirt passing through the fastener assembly to the interior of the automobile.

It is still another object of the present invention to provide a fastener assembly in which the sealing and mounting efficiency of the grommet portion is not compromised by tolerance variations in the body panel aperture to which the fastener assembly is attached.

It is yet another object of the present invention to provide a retainer grommet assembly which is simple and efficient in design, uses a minimum number of moving parts, is virtually indestructible and can be used to fasten as well as unfasten interior parts of an automobile—upholstery or trim—to a body panel member.

According to a preferred embodiment of the invention there is provided a grommet of soft or flexible plastic material which forms a non-porous seamless bathtub-like enclosure that fits into an aperture in the body panel part of the automobile. A depending lug from the interior part of the automobile is provided with a metal retainer member that forms a pliable prong that can be pushed into a snap-fit relationship with the flexible grommet member and thus cause opposing wall portions of the grommet to expand into a seal-tight engagement with the rim of the aperture in the body panel part of the automobile.

The invention will be better understood and further objects and advantages thereof will become more apparent from the ensuing detailed description of the preferred embodiment taking in conjunction with the drawings.

DETAILED DESCRIPTION OF THE PREFERRED EMBODIMENT

Figure 1:
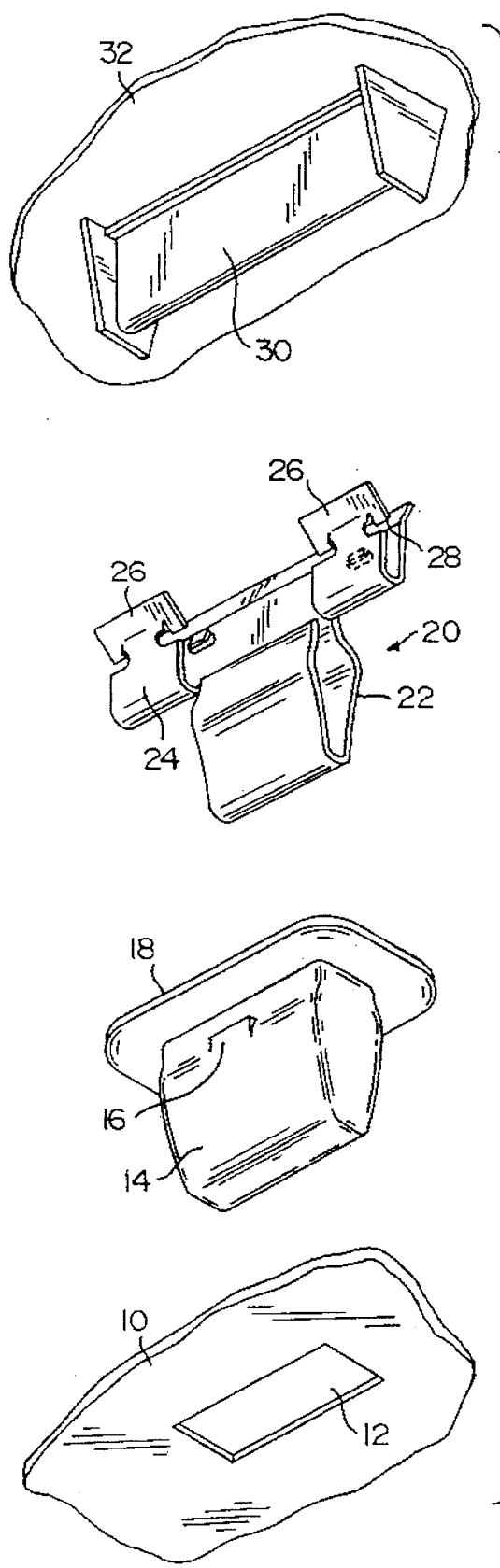
FIG. 1 is a schematic exploded perspective view of the grommet fastener assembly in relation to a body panel of an automobile according to the invention.
Figure 2:
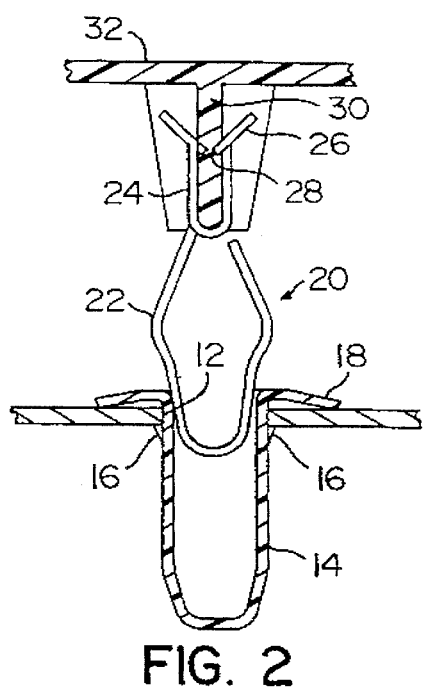
FIG. 2 is a schematic partial cross-section of the grommet fastener assembly showing the retainer member thereof in non-retentive operation according to the invention.
Figure 3:
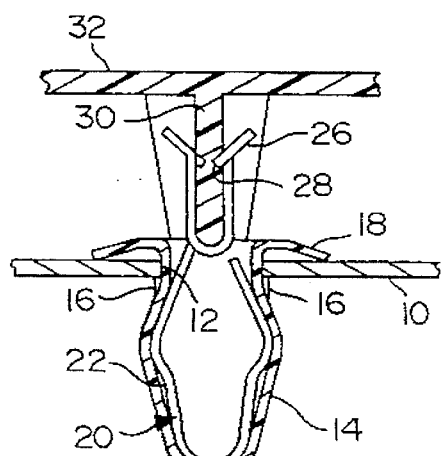
FIG. 3 is a schematic partial cross-section of the grommet fastener assembly showing the retainer member thereof in its retentive operation according to the invention.

Referring now to FIG. 1 there is shown an automobile body panel member 10 with a generally oblong aperture 12 therein, it being understood that such a panel member would have several such holes aligned along side a door frame or other interior part of an automobile. It should also be understood that the panel member may be either an exposed exterior panel or an interior body panel. A grommet member 14 composed of a soft flexible plastic material, a synthetic plastic, for example, is shown to have exterior side protuberant members 16 and a lip or flange portion 18. Together with the lip or flange portion 18 of the grommet which rides along the top of the rim of the oblong hole 12 in the body panel, the protuberant side members 16 engage the underside of the rim of the aperture 12 to thereby hold the grommet in place with respect to the aperture, as best shown in FIGS. 2 and 3. It is not necessary that the tab and flange portions of the grommet just described hold the grommet rigidly with respect to the aperture; the fit indeed may be a loose one, since there may be variations in dimensional tolerances from one aperture to the next, particularly in the width dimension of the aperture.

In accordance with one feature of the invention and as will be explained below, the flexibility of the grommet will accommodate such dimensional variations once the fastener is operational.

Further according to the invention, the flexible grommet 14 is seen to have completely enclosed sidewalls, endwalls and a bottom wall (see FIG. 2) so as to form a non-porous seamless enclosure, like a bathtub, surrounding the pliable metal prong member to be described below.

A pliable metal retention prong member 20 is seen to comprise essentially two parts, namely, a diamond-shaped free end 22 which, according to one aspect of the invention, is shown to be a length of sheet metal bent over on itself to form a diamond-shaped prong. The transverse dimension or width of the prong 20, that is, the free end 22 is somewhat wider than the width dimension of the aperture 12, to be more fully explained below. The other end of the pliable metal member 20 may be in the form of a conventional U-shaped clip 24 having flared end portions 26 which have cut-out portions 28, as shown, that form wedge-like extensions for gouging or cutting into the respective sides of an elongated plastic member 30 depending from the interior panel 32 (see FIGS. 2 and 3) associated with the upholstering material of the automobile, not shown. Other structures may also be used for associating the prong member with the panel.

As shown in FIG. 2 the grommet fastener assembly according to the invention is shown in its assembled state, that is, the metal pliable member 20 is fixedly connected to the depending member 30 of the interior panel 32, which panel, with the upholstering or trim material attached thereto, is to be fastened to the exterior body panel 10 of the automobile. In FIG. 2 the prong 20 is shown just prior to being inserted into the grommet 14 that is fitted in the aperture 12 of the body panel 10.

In FIG. 3 the prong 20 is shown fully inserted into the grommet 14, the prong having squeezed past the top opening in the grommet so that the prong can expand to its former state which is wider than the width of the aperture 12 when fully inserted into the grommet, as shown. The expansion of the prong 20 back to its former state, which is wider than the aperture 12 and also wider than the width of the flexible grommet 14, causes the flexible grommet to expand, thus causing its sidewalls to squeeze tightly against the rim of the aperture 12, the protuberant members 18 being pushed up against the underside of the underside of the rim of the aperture 12 as well, and thus making for a seal-tight fit of the grommet in the aperture 12. Should there be any tolerance variations in the size of the opening of the aperture 12, especially in the width dimension, the grommet 14 will accommodate these variations when it expands under the bias of the prong 20.

Because the grommet 14 is a non-porous seamless enclosure open only at its top end where the prong member 20 is inserted, the grommet will act as a seal between the exterior of the body panel 10 and the interior panel 32 of the automobile and so prevent the passage of moisture, fluid and dirt through the fastener assembly and thus keep the metal parts clean and free from corrosion and rust. In addition, when this invention is used to attach a decorative upholstery member to an interior body panel, for example in windshield support columns, the device serves to significantly reduce noise transmission to the interior of a vehicle.

The foregoing relates to a preferred exemplary embodiment of the present invention, it being understood that other methods and variants thereof are possible within the scope of the invention, the latter being defined by the appended claims.

What is claimed and desired to be secured by Letters Patent of the United States is:

1. A fastener assembly for securing an interior panel associated with upholstering material to a body panel of a vehicle comprising, a pliable retention member extending from said interior panel toward said body panel, a grommet formed of a non-porous flexible material and having a flange for mounting on the topside of the rim of an aperture in said exterior body panel to thereby form a sealed enclosure having generally the same peripheral dimension in a plane coplanar with the plane of said aperture, said grommet having exterior tab means for engaging the underside of said exterior panel to thereby hold said grommet in place with respect to said aperture, and said pliable retention member including a portion extending behind said panel and beyond the rim of said aperture, said portion bearing against the side walls of said flexible grommet and causing said grommet to expand beyond the peripheral dimension of said aperture when said retention member is inserted into the interior of said grommet below the plane of said flange and said aperture, thereby causing said grommet to increase its hold in a seal tight manner against the rim of said aperture in said exterior body panel.

2. A fastener assembly as claimed in claim 1 wherein said grommet comprises a closed cup-shaped body for receiving said retention member.

3. A fastener assembly for securing an interior panel associated with upholstering material to an exterior body panel of a vehicle comprising, an elongated member depending from said interior panel of said vehicle and having a pliable retention member thereon, a grommet formed of a non-porous flexible material and having a flange for mounting on the topside of the rim of an aperture in said exterior body panel of said automobile to thereby form a sealed enclosure having generally the same peripheral dimension in a plane coplanar with the plane of said aperture, said grommet having exterior tab means for engaging the underside of said exterior panel to thereby hold said grommet in place with respect to said aperture, and said pliable retention member comprising a generally V-Shaped extension portion for entering and engaging said grommet, said extension portion being wider in its relaxed position than the width of said grommet below the back surface of said body panel so that said extension portion engages the side walls of said flexible grommet behind said body panel and causes said grommet to expand beyond the peripheral dimension of said aperture when said retention member is inserted into the interior of said grommet below the plane of said flange and said aperture, thereby causing said grommet to increase its hold in a seal-tight manner against the rim of said aperture in said exterior body panel of said vehicle.

4. A fastener assembly as claimed in claim 3 wherein the length of said extension portion from its widest point to its end is less than the interior length of the grommet below the back surface of said panel to enable said extension portion to force said grommet outwardly under said panel.

5. A fastener assembly as claimed in claim 3 wherein said extension portion tapers upwardly from its widest dimension to a width equal to the width of said aperture.

6. A fastener assembly for securing an interior panel associated with upholstering material to an exterior body panel of a vehicle comprising, an elongated member depending from said interior panel of said vehicle, a pliable metal retention member having a first end means for gripping and securing said elongated member, and a second free end in the form of a diamond-shaped planar prong member having pliability in a transverse dimension, a grommet formed of a non-porous flexible material having a flange for mounting on the topside of the rim of an aperture in said exterior body panel of said vehicle to thereby form a sealed enclosure having generally the same peripheral dimension as said aperture, said grommet having exterior tab means for engaging the underside of said exterior panel to thereby hold said grommet in place with respect to said aperture, said pliable retention member comprising a generally V-shaped extension portion for entering and engaging said grommet, said extension portion being wider in its relaxed position than the width of said grommet below the back surface of said body panel so that said extension portion engages the side walls of said flexible grommet behind said body panel and causes said grommet to expand beyond the peripheral dimension of said aperture when said retention member is inserted into the interior of said grommet below the plane of said flange and said aperture, thereby causing said grommet to increase its hold in a seal-tight manner against the rim of said aperture in said exterior body panel of said vehicle.

* * * * *